(12) United States Patent
Nagy et al.

(10) Patent No.: US 7,024,174 B2
(45) Date of Patent: Apr. 4, 2006

(54) METHOD AND SYSTEM FOR DATA MANAGEMENT IN ELECTRONIC PAYMENTS TRANSACTIONS

(75) Inventors: Dan Nagy, Cold Spring Harbor, NY (US); Paul Goott, Madison, NJ (US); John Landry, Norwalk, CT (US); David Cox, Old Greenwich, CT (US); Michael C. Pang, Douglastown, NY (US); Joe Favole, Howell, NJ (US); Michael Thompson, Centereach, NY (US)

(73) Assignee: Citibank, N.A., New York, NY (US)

( * ) Notice: Subject to any disclaimer, the term of this patent is extended or adjusted under 35 U.S.C. 154(b) by 324 days.

(21) Appl. No.: 10/200,275

(22) Filed: Jul. 22, 2002

(65) Prior Publication Data

US 2003/0119478 A1    Jun. 26, 2003

Related U.S. Application Data

(60) Provisional application No. 60/307,525, filed on Jul. 24, 2001.

(51) Int. Cl.
*H04M 11/00*    (2006.01)

(52) U.S. Cl. ........................ 455/408; 455/410; 455/411
(58) Field of Classification Search ........ 455/405–411; 379/114.01, 114.15 TO, 114.23, 144.01
See application file for complete search history.

(56) References Cited

U.S. PATENT DOCUMENTS

| | | | |
|---|---|---|---|
| 5,909,485 A | 6/1999 | Martin et al. | 379/144 |
| 5,995,822 A | 11/1999 | Smith et al. | 455/406 |
| 6,049,710 A | 4/2000 | Nilsson | 455/409 |
| 6,075,982 A | 6/2000 | Donovan et al. | 455/406 |
| 6,101,378 A | 8/2000 | Barabash et al. | 455/406 |
| 6,137,872 A * | 10/2000 | Davitt et al. | 379/114.2 |
| 6,167,251 A | 12/2000 | Segal et al. | 455/406 |
| 6,185,414 B1 | 2/2001 | Brunner et al. | 455/406 |
| 6,188,752 B1 | 2/2001 | Lesley | 379/114 |

(Continued)

FOREIGN PATENT DOCUMENTS

EP    0 698 987 A2    2/1996

OTHER PUBLICATIONS

Preliminary Examination Report for Application No. PCT/US02/23099, dated Nov. 19, 2003 (mailing date).

(Continued)

*Primary Examiner*—Duc Nguyen
(74) *Attorney, Agent, or Firm*—George T. Marcou; Kilpatrick Stockton LLP

(57) ABSTRACT

A method and system for prepaying wireless telecommunications charges utilizes computer hardware and software including, for example, a user's mobile phone, a mobile operator's interactive voice response unit, a mobile payments interactive voice response unit, SMS, test messaging, email, ATM, kiosk, the Internet, and/or WAP or the like, a mobile payments engine, a mobile operator's prepaid billing system, a subscriber database, a payment gateway, and a transaction processing platform. The mobile payments engine receives information identifying a user's wireless telecommunication device via the mobile payments interactive voice response unit, passes the information to the mobile operator's billing system with a request for validation of a mobile account for the user, and if validation is received, the mobile payments engine receives financial source account and user identity verification information from the user, assigns a mobile personal identification number for the user, and arranges a credit from the source account to the user's mobile account.

38 Claims, 10 Drawing Sheets

U.S. PATENT DOCUMENTS

| | | | |
|---|---|---|---|
| 6,226,364 B1 | 5/2001 | O'Neil | 379/112 |
| 6,282,276 B1* | 8/2001 | Felger | 379/114.19 |
| 6,298,250 B1 | 10/2001 | Nilsson | 455/569 |
| 6,308,053 B1 | 10/2001 | Nilsson | 455/90 |
| 6,333,976 B1* | 12/2001 | Lesley | 379/114.01 |
| 6,393,269 B1 | 5/2002 | Hartmaier et al. | 455/406 |
| 6,473,500 B1* | 10/2002 | Risafi et al. | 379/144.01 |
| 6,480,710 B1 | 11/2002 | Laybourn et al. | 455/406 |
| 6,487,401 B1 | 11/2002 | Suryanarayana et al. | 455/406 |
| 6,526,273 B1 | 2/2003 | Link, II et al. | 455/406 |
| 2002/0133457 A1* | 9/2002 | Gerlach et al. | 705/39 |

OTHER PUBLICATIONS

Written Opinion for Application No. PCT/US02/23099, dated Jun. 17, 2003 (mailing date).

International Search Report for Application No. PCT/US02/23099, dated Dec. 12, 2002 (mailing date).

Morrison, Diane, "Mobile Learns to Pay Its Way," *New Media Age*, vol. 40, No. 2, 4 pp., Mar. 28, 2002.

"NMA/Wireless: Mobile Learns to Pay Its Way," *New Media Age*, 3 pp., Mar. 28, 2002.

"Mobile Matters: Pay Your Way . . . by Phone: Forgot Your Wallet? No Problem. Use Your Mobile to Pay Your Way Out of Trouble, Says Joia Shillingford," *Guardian*, 3 pp., Jan. 17, 2002.

"Norwegian Mobile Operator Implements Euronet Mobile Recharge," *Business Wire*, p. 357, Dec. 5, 2001.

Schwartz, Evan I., "Digital Cash Payoff: Simplicity and Fraud Prevention are Helping Paypal Make Digital Payments Real. A Worried Credit Card Industry Takes Note," *Technology Review*, vol. 62, No. 7, 7 pp., Dec., 2001.

Cho, George, "How Long Until Anonymous Smart Cards Take Over Here?," *Canberra Times*, CT Ed., p. 15, Oct. 22, 2001.

"Wireless Networks, Foolish Choices (Developing the Intelligence of Computer Systems and Telephone Networks)," *Wireless Insider*, vol. 2, No. 34, 2 pp., Sep. 10, 2001.

"Ease and Convenience Keep Customers Coming Back (VeriFone's Verix)," *Credit Card Management*, vol. 14, No. 7, p. 2S4, Sep., 2001.

"Major Telcos to Launch Payment Services (France Telecom and British Telecom to Offer Alternative to Bank-Controlled Payment Services for Online Transactions)," *Card Technology*, vol. 2, No. 8, p. 8+, Aug., 2001.

"Mosaic Software's Postilion PrePay at PayPoint Used for Splash Plastic Pre-Pay Top-Ups in the UK," *PR Newswire*, 2 pp., May 11, 2001.

"GSM Carriers Offer Options for Prepaid Top-Ups," *Card Technology*, pp. 18-21, Apr., 2001.

Denny, Charlotte, "Hackers Hold Sway for Now: Online Credit Card Fraud Runs into Billions, and So Far Banks and Retailers Have Failed to Agree on a Common, Practical Solution, Says Charlotte Denny," *Guardian*, 2 pp., Mar. 29, 2001.

Young, Deborah, "Prepaid's Perils," *Wireless Review*, vol. 17, No. 23, pp. 50-58, Dec. 1, 2000.

"Software and Services: TIM—Italian Style Mobile," *Roam*, p. 30, May 8, 2000.

"Vodafone Launches Pre-Paid Calling-Card Scheme (Vodafone is to Introduce the UK's First Pre-Paid Calling-Card Scheme Targeting Potential Customers Who Don't Have a Full-Time Contract With a Service Provider)," *Mobile Communications*, No. 199, p. 1, Jul. 25, 2996.

* cited by examiner

| Subscriber Interaction Methods/Distributions Channels |
|---|
| Mobile telephone handset or PDA device —— 30 |
| Internet ———————————————— 32 |
| Personal computer ——————————— 34 |
| Landline telephone ——————————— 36 |
| ATM and ATM network ———————— 38 |
| Kiosk ————————————————— 40 |
| Point of sale device or terminal ————— 42 |

Fig. 8

METHOD AND SYSTEM FOR DATA MANAGEMENT IN ELECTRONIC PAYMENTS TRANSACTIONS

PRIORITY APPLICATION

This application claims the benefit of U.S. Provisional Application No. 60/307,525 filed Jul. 24, 2001 and entitled "Method and System for Prepaying Wireless Phone Charges (Prepaid Enrollment)", which is incorporated herein by this reference.

FIELD OF THE INVENTION

The present invention relates generally to the field of electronic commerce, and more particularly to a method and system for prepaying or replenishing prepaid telecommunications charges, such as wireless telephone charges.

BACKGROUND OF THE INVENTION

Wireless telecommunications providers are interested in the pre-paid business, because it negates the need to send a bill or perform any credit check and provides for payment in advance. "Pre-paid cellular" is especially popular in Europe where it represents 70% to 80% of the market. This translates into over twenty million pre-paid phones in the Great Britain alone. There are three current methods of recharging or replenishing pre-paid phone charges or "topping-up" as it is sometimes called. In a first method, a so-called "scratch card" is purchased from a merchant, such as a news agent or other retailer, and the back of the card is scratched off to reveal a number. When the number is keyed into the pre-paid phone, the minutes purchased are activated and the subscriber can make calls. The cards may be at as much as a 20–30% discount, wherein $100 worth of minutes is sold to the retailer for $70 to $80.

In a second method, a card referred to as an "electronic swipe card" is issued by the mobile operator that can be recharged or replenished at a participating retailer's store. A subscriber can use this card to replenish the mobile phone prepaid charges any time provided there is sufficient credit available. In a third method, referred to as "credit/debit card replenishment", a subscriber types in the subscriber's credit/debit card number into the mobile phone or a web site, and the subscriber's card account is debited appropriately. This method requires pre-registration. The first method is by far the most popular but by far the most expensive for the operator, with as much as a 20% to 30% discount to retailers. On the other hand, the third method is potentially the cheapest for the mobile phone operator, but that method also carries the largest risk of fraud. Many mobile phone operators have sought a low risk solution to the third method. However, a serious problem in accepting credit/debit card payments is the need to confirm the identity the pre-paid subscriber, which means that the legitimacy of the card cannot be confirmed without exhaustive and expensive checks.

SUMMARY OF THE INVENTION

It is a feature and advantage of the present invention to provide a method and system for prepaying or replenishing prepaid wireless telephone charges which enables the use of debit card and credit card payments which can be accepted from virtually any issuing financial institution.

It is an additional feature and advantage of the present invention to provide a method and system for prepaying or replenishing prepaid wireless telephone charges which links any consumer account to the telecommunications provider's prepaid billing system as long, as the account can be reached through existing networks, which includes the ability to use smart cards and other stored value options.

It is another feature and advantage of the present invention to provide a method and system for prepaying or replenishing prepaid wireless telephone charges utilizing a registration process that is automatic and that greatly reduces charge-backs and the risk of fraud.

It is a further feature and advantage of the present invention to provide a method and system for prepaying or replenishing prepaid wireless telephone charges that can be used with any mobile phone without the necessity of modifying the phone in any way.

It is an additional feature and advantage of the present invention to provide a method and system for prepaying or replenishing prepaid wireless telephone charges which eliminates the costly distribution process that utilizes physical cards and/or tickets.

It is another feature and advantage of the present invention to provide a method and system for prepaying or replenishing prepaid wireless telephone charges from numerous subscriber interaction channels including: but not limited to telephone (POTS), point-of-sale (POS) terminal, automatic teller machine (ATM), computer network (the Web), Wireless Access Protocol (WAP), and Short Message Service (SMS).

It is further feature and advantage of the present invention to provide a method and system for prepaying or replenishing multiple prepaid wireless telephone accounts using a single credit debit or stored value account (i.e., parent/child) to support a parent who uses the same financial institution account to replenish both the parent's prepaid mobile account and the child's prepaid mobile account.

It is an additional feature and advantage of the present invention to provide a method and system for presenting bills to subscribers and enabling subscribers to pay for other telecommunications provider and non-telecommunications provider related activities using the same method and system as for prepaying or replenishing multiple prepaid wireless telephone accounts.

To achieve the stated and other features, advantages and objects, an embodiment of the present invention provides a method and system for prepaying or replenishing prepaid wireless telephone charges utilizing computer hardware and software that enables subscribers of a telecommunications provider to purchase their air time directly on the cell phone without having to go to a retailer to purchase a card or ticket. An embodiment of the present invention allows access to a source account for the subscriber's payment, which is taken and immediately transferred through the telecommunications company to the subscriber's account with the telecommunications company, so that the subscriber has use of airtime represented by the money taken. The present invention provides a solution to the risk of fraud in the credit/debit card method of replenishment of prepaid mobile phone charges and allows accepting credit/debit card payments to be received from virtually any issuing bank, employs a registration process that is automatic and greatly reduces the risk of fraud, and works, for example, with any presently available mobile phone without modifications, such as WAP or SIM Toolkit.

An embodiment of the present invention utilizes computer hardware and software and includes, for example, a user's choice of an interaction method, such as a mobile telephone handset or personal digital assistant (PDA) device, the Internet, a personal computer (PC), a landline telephone, ATM and ATM network, a kiosk, and/or a POS device or terminal. In addition, the method and system for an embodiment of the present invention makes use, for example, of a mobile operator's interactive voice response unit, a mobile payments interactive voice response unit, a mobile payments engine, a mobile provider's prepaid billing system, a subscriber database, a payment gateway, and a transaction processing platform.

In an embodiment of the invention, information identifying a user's wireless telecommunication device, such as the user's mobile phone number, is received by the mobile payments engine via the mobile payments interactive voice response unit, for example, from the mobile operator's interactive voice response unit or phone switch. The mobile payments engine passes the information identifying the wireless telecommunication device to the mobile operator's billing system with a request for validation of a mobile account for the user related to the device. If validation of the account is received from the mobile operator's billing system, the mobile payments engine prompts the mobile payments interactive voice response unit to play a script for the user for entry of financial source account information, and the financial source account information is received by the mobile payments engine from the user via the mobile payments interactive voice response unit. The financial source account information includes, for example, information regarding one or more of the user's credit card account, debit card account, and/or deposit account, and the mobile payments engine stores the financial source account information in a database, for example, of a financial institution storing subscriber information ("subscriber database").

In an embodiment of the present invention, the mobile payments engine also receives user identity verification information via the mobile payments interactive voice response unit. In one aspect of the invention, the user identity verification information consists of a secret shared between the user and the mobile payments engine, such as the user's entry of two debit amounts previously charged to the financial source account for the user via the mobile payments engine. In this aspect, for example, two debit amounts are generated by the mobile payments engine that sum to a predetermined total debit amount requested by the user. The mobile payments engine formats and sends debit transactions for the two debit amounts to a payment gateway and notifies the user via the mobile payments interactive voice response unit that two sums equal to the predetermined total debit amount will be charged to the financial source account without disclosing the two debit amounts to the user. The mobile payments engine prompts the user via the mobile payments interactive voice response unit to contact the financial institution with which the financial source account is held to ascertain the two debit amounts. While two debit amounts is used as an example, it is to be noted that other information can likewise be utilized, such as (a) one debit equal to or less than a predetermined upper limit; (b) two or more debits summing up to a given amount determined by the use; (c) two or more debits summing up to a given amount determined, for example, by the mobile payments engine; and (d) both (b) and (c) summing up to an amount equal to or less than an upper limit determined by either the mobile payments engine or the user. In an alternative aspect, the user identity verification information consists, for example, of user billing information and/or an identification characteristic assigned by a trusted third party for the user, such as a Social Security System number for the user received by the mobile payments engine via the mobile payments interactive voice response unit.

In either aspect, the mobile payments engine assigns a mobile personal identification number for the user, which can be generated by the mobile payments engine, or the user can be given an option to self-select the mobile personal identification number. Thereafter, the mobile payments engine can arrange a credit to the user's mobile account via the mobile operator's prepaid billing system upon receipt of information identifying the user's wireless telecommunication device, the user's mobile personal identification number, and a credit amount requested by the user via the mobile payments interactive voice response unit. The mobile payments engine maps the information identifying the user's wireless telecommunication device to the user's financial source account, validates the user's mobile payments personal identification number, and sends an authorization request for the credit amount to a payment gateway. Upon receiving an authorization response for the credit amount from the payment gateway, the mobile payments engine sends a message to the mobile operator's prepaid billing system to credit the user's account with the credit amount. The mobile payments engine receives a response from the mobile operator's prepaid billing system confirming the credit and confirms the credit to the user via the mobile payments interactive voice response unit. In another aspect of the invention, the mobile payments engine can establish an automated, recurring credit to the user's mobile account.

In another embodiment of the invention, a phone number of a wireless phone of a user is captured by the mobile payments engine via a call by the user to the interactive voice response unit. The mobile payments engine receives the user's entry via the interactive voice response unit of financial source account identification information that allows access by the mobile payments engine to at least one source account of funds of the user through a link. The mobile payments engine notifies the user via the interactive voice response unit that at least two debits in an amount between 0 and a predetermined number of units of applicable currency from the financial source account will be posted to a user account with a preselected wireless phone provider.

The mobile payments engine directs the user via the interactive voice response unit to the financial institution with which the financial source account is held to verify the amounts of the two debits and to contact the interactive voice response unit via a second call with the user's wireless phone number. Upon receiving the user's second call by the interactive voice response unit, the mobile payments engine confirms the user's wireless phone number via caller ID or by the user's entry or speaking through voice recognition of the user's phone number and prompts the user to enter the two debit amounts. If the user enters the two debit amounts correctly, the mobile payments engine credits the two debits to the user account with the wireless phone provider and provides the user a mobile personal identification number for use by the user in future transactions via the mobile payments engine. As noted above, other information can likewise be used instead of the two debit amounts.

Thereafter, upon receiving information from the user by the mobile payments engine via the mobile payments interactive voice response unit, such as the user's mobile personal identification number, the user's wireless phone number and a requested replenishment amount, the mobile payments engine maps the information to the financial source account information for the user and passes the information via the link to the financial institution with which the financial source account is held. Upon receipt by the mobile payments engine of an authorization message via the link from the financial institution, the mobile payments engine passes the authorization to the prepaid billing system of the wireless phone provider informing the wireless phone provider to credit the user's account. In addition, the mobile payments engine sends a message to the user via the mobile payments interactive voice response unit confirming a credit of the requested replenishment amount to the user account with the wireless phone provider.

In a further embodiment of the invention, the mobile payments engine receives the user's entry via an interactive voice response unit of user identity verification and financial source account information that allows the mobile payments engine access to at least one source account of funds of the user through a link. The mobile payments engine assigns the user a mobile personal identification number for use by the user in replenishing the account of the user with the wireless telecommunications provider. Alternatively, the mobile payments engine allows the user to self-select the user's mobile personal identification number. Upon receiving the user's selection via the interactive voice response unit of an amount by which to increment the user's wireless telecommunications account, the mobile payments engine generates a transaction in the amount requested by the user and instructs the prepaid billing system of the user's wireless telecommunications provider to increment the user's wireless telecommunications account by the requested amount.

In another aspect of an embodiment of the invention, the mobile payments engine provides the user an option via the mobile payments interactive voice response unit to set up an automated, recurring credit to the user's wireless telecommunications account, such as an automated, monthly credit on a preselected date or an automated, monthly credit, if the user's wireless telecommunications account falls below a predetermined level. Alternatively, the mobile payments engine provides the user an option via the mobile payments interactive voice response unit to receive an alert notifying the user when the user's wireless telecommunications account requires replenishment.

Additional objects, advantages and novel features of the invention will be set forth in part in the description which follows, and in part will become more apparent to those skilled in the art upon examination of the following, or may be learned from practice of the invention.

BRIEF DESCRIPTION OF THE DRAWINGS

FIG. 8 is a table that shows examples of subscriber interaction methods/distributions channels for an embodiment of the present invention.

DETAILED DESCRIPTION

Figure 1:
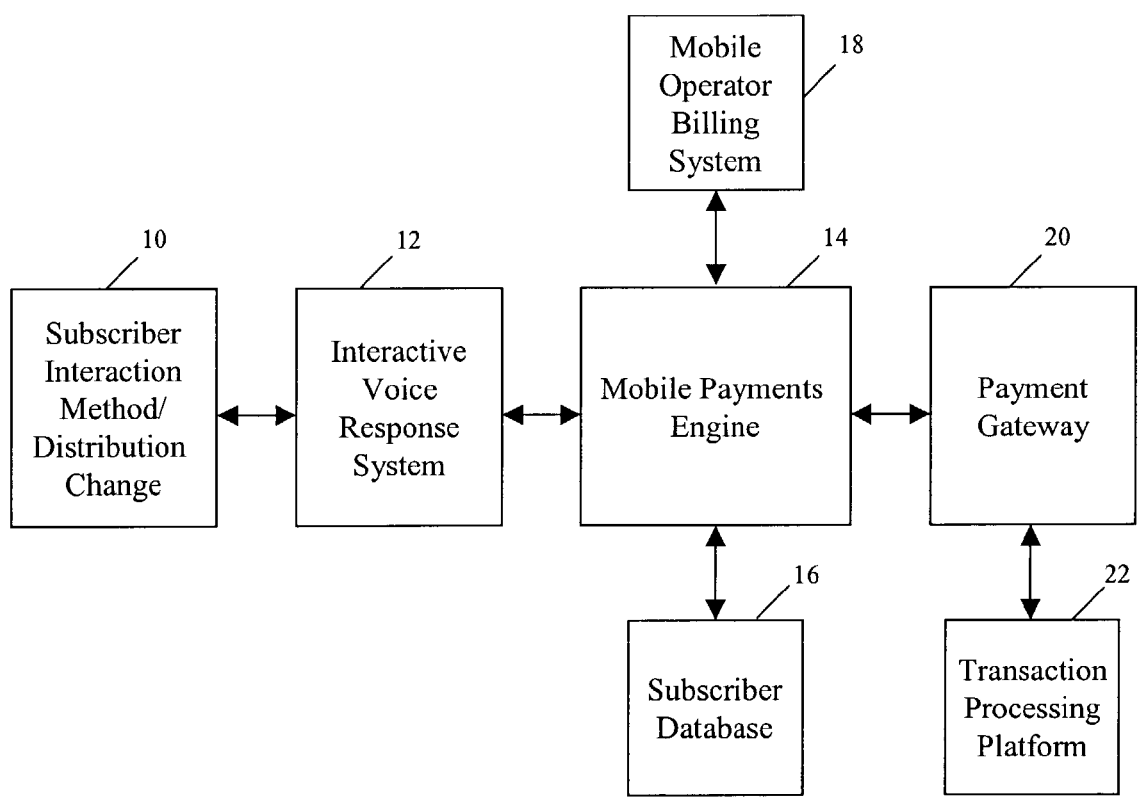
FIG. 1 is a schematic diagram which illustrates an example of major system objects and the flow of information between the major system objects for the method and system for wireless telecommunications payments for an embodiment of the present invention.

Referring now in detail to embodiments of the invention, an example of which is illustrated in the accompanying drawings, the method and system of the present invention provides a way for subscribers of a telecommunications provider who have wireless phones to purchase their air time directly on the cell phone, for example, without having to go to a retailer to purchase the cards. Instead, an embodiment of the present invention enables access, for example, through stored value or a stored wallet, or directly through a credit card, or to the subscriber's checking account, from which the money can be taken and immediately transferred through the telecommunications company to the subscriber's account with the telecommunications company, so that the subscriber has use of air time represented by the money taken.

An embodiment of the present invention eliminates the costly distribution process that makes use of physical cards or tickets that are distributed, for example, through retailers. The present invention provides a process that enables a subscriber to replenish the subscriber's prepaid phone charges by simply pressing buttons on the subscriber's cell phone keypad or by verbal input and allows the money to be taken directly, for example, from a credit card or a demand account and transferred to the telecommunications company or applied to the subscriber's personal account for use of a predetermined number of minutes. For example, a cell phone subscriber can call up a number and be identified not only as the holder of the cell phone, but also as the holder of the account, and effectively instruct a financial institution, such as a bank, to credit the telecommunications company for a certain amount of money, either through the subscriber's credit or checking account, debit card, or other demand deposit account.

The method and system for an embodiment of the present invention enables subscribers to purchase cellular airtime from mobile operators. The service is global and involves enrolling subscribers in an airtime replenishment service by registering financial account information. The present invention enables a financial institution, such as a bank, to transfer money from a credit card or a demand deposit account at any financial institution to the mobile operator in exchange for incrementing the subscriber's account with the mobile operator with value. For example, a mobile phone subscriber can call a number to connect to the system and be identified not only as the holder of the mobile phone, but also as the holder of the registered financial account, and effectively instruct the bank to transfer funds from the subscriber's registered financial account to the mobile operator in exchange for airtime.

An embodiment of the invention utilizes an enrollment/registration process that combines the authentication of the subscriber with the funding of a mobile operator's financial account and the incrementing of a subscriber's account with the mobile operator. At least two types of the enrollment/registration process are provided, depending on the requirements of the mobile operator and/or the subscriber interaction methods as described in further detail hereinafter. A first type of enrollment process (referred to herein as "Type 1") involves the placing of two small debits to the registered financial account in order to authenticate the subscriber as the legitimate cardholder. A second type of enrollment registration process (referred to herein as "Type 2") does not require this activity to authenticate the cardholder. Rather, the Type 2 process involves having the subscriber respond to additional queries to adequately authenticate the subscriber to the financial networks. The Type 1 and Type 2 enrollment/registration processes are described hereinafter in further detail.

FIG. 1 is a schematic diagram which illustrates an example of major system objects and the flow of information between the major system objects for the method and system for wireless telecommunications payments for an embodiment of the present invention. Referring to FIG. 1, the major system objects, which interact to perform the enrollment/registration, funds transfer processes, and account management and reporting functions for the mobile operator, include, for example, a subscriber interaction method/distribution channel 10, an Interactive Voice Response (IVR) system 12, a mobile payments engine 14, a subscriber database 16, a mobile operator billing system 18, a payment gateway 20, and a transaction processing platform 22. The subscriber chooses the subscriber interaction method/distribution channel 10 by which to connect and interact with the service. Such channels include, for example, a mobile telephone handset or personal digital assistant (PDA) device, a phone call to IVR-Dual Tone Multi Frequency (IVR-DTMF) and speech recognition, text messaging, the Internet, a personal computer (PC), a landline telephone call to IVR, ATM access, a kiosk, and retail POS terminal.

The IVR system 12 answers calls and manages data flow and queuing between the telephone system (POTS) and the mobile payments engine 14. The IVR system 12 is programmed, for example, to handle data keyed into keypad or spoken over the phone line via voice/speech recognition software which is configured in multiple languages. The mobile payments engine 14 manages transaction workflow, subscriber data access, and reporting and administrative access. The subscriber database 16 contains subscriber credit card/debit card/demand deposit or other financial account information, mobile personal identification number (mPIN) and knowledge of the transactions related to the enrollment/registration and replenishment processes.

The mobile operator billing system 18 stores subscriber account value and decrements value as calls are made. The mobile operator billing system 18 is typically owned by the telecommunications provider and accessed, for example, by an Application Program Interface (API)/Sockets or similar interface provided by the telecommunications provider. The payment gateway 20 routes, formats, manages batching and settlement transactions for credit and signature debit card authorization, settlement, credits, fraud scoring, and reporting. Finally, the transaction processing platform 22 processes transactions received from the gateway 20, settles funds to the designated financial accounts, and provides transaction details to reporting components housed in the payment gateway 20.

An embodiment of the present invention involves, for example, a two-step process, one of which is enrollment and the other of which is the actual debiting of an account. As an example of the enrollment process for an embodiment of the invention, a subscriber buys a cell phone, and written instructions are provided in the box in which the cell phone is packaged that inform the subscriber about different options that are available to the subscriber for talking on his or her cell phone. One of those options allows the subscriber to call a number directly from his or her cell phone, which connects the subscriber to the IVR 12. The IVR 12 captures the subscriber's cell phone number, and if the number is not available, the subscriber is prompted to enter the number by keying or through speaking. The IVR 12 prompts the subscriber to enter, for example, the subscriber's ATM or debit or credit card number that is embossed on the card and the start and the expiry date and/or issue date of the card.

In areas where available, the IVR 12 also captures the issue number of the ATM or debit or credit card, which is a sequence number for multiple cards that are distributed on the same account. For example, a subscriber's ATM or debit or credit card may have 01 as its issue number, and the subscriber's spouse may have a second ATM card on the account with 02 as its issue number. Thereafter, the subscriber is told that two debits in an amount, for example, between 1 and 200 units of applicable currency will be posted to the subscriber's account. The process of debiting the account involves, for example, the subscriber verifying the two debits. Thus, the subscriber is asked to contact the financial institution which issued the card and at which the financial account is domiciled, such as by visiting the subscriber's home banking application, through telephone banking, or going to a branch, if necessary, to discover the two debits and call the IVR on the number a second time with the subscriber's cell phone number.

Continuing with the example, the subscriber again connects with the IVR 12, and the subscriber's cell phone number is known to the IVR 12 from caller ID or through entry by the subscriber. The subscriber is prompted at that moment to enter the two debit amounts. If the subscriber enters the correct debit amounts, the mobile payments engine knows whether the two debit amounts match, based on the fact that the financial institution issued the original debits. At that point, the subscriber receives a mobile personal identification number (mPIN) that can either be randomly generated or subscriber selected, which the subscriber can use in future transactions. As the session continues with the IVR 12, the subscriber is told that the two debits will be credited to the subscriber's prepaid mobile account, and the subscriber is asked whether he or she would like to add additional funds to the prepaid mobile account. If so, the subscriber is prompted to input the amount he/she would like to add, and the card is charged for the additional amount. At the conclusion of the session with the IVR 12, the subscriber is thanked for enrolling.

Also at the conclusion of the IVR session, the subscriber is invited to return whenever the subscriber thinks he or she needs to replenish the mobile account, or the telecommunications company can alert the subscriber that the subscriber's air time is running low and that he or she needs to replenish the mobile account. Thus, one is a proactive process, and the other one is reactive. For example, assume that a few days pass and the subscriber needs to replenish the account. In the replenishment process, the mobile provider sends the subscriber a short message service (SMS) text message alerting the subscriber of a low time balance. The subscriber sends back an authorizing SMS text message that includes an amount, such as $50, the mPIN that was previously furnished to the subscriber, and the mobile phone number. This message is sent back to the mobile provider to initiate the replenishment.

Still continuing with the example, upon receipt of the SMS text message from the subscriber, the mobile provider sends that same message with the amount and the subscriber's mPIN and mobile phone number to the financial institution's mobile payments engine 14, which maps the incoming message to the real card number, the expiration date, and the card issue number that was received when the subscriber enrolled. The real card number is the number embossed on the subscriber's card that was enrolled when the subscriber first contacted the financial institution during the enrollment process. The mobile payments engine 14 sends the real information to a processor of the financial institution, such as an ATM switch. The ATM switch passes the message to the various card processing networks, and the network sends the message to the financial institution that issued the card for authorization.

At this point, the transaction looks as if it came from a POS terminal at a retail store in the manner of a typical POS transaction. The issuing financial institution authorizes the transaction and sends an authorization message back through the network in a typical fashion. The authorization message is passed on by the network to the financial institution which enrolled the subscriber's card and is sent by that financial institution to the mobile payments engine 14. The mobile payments engine 14 passes the authorization message on to the mobile provider, informing the mobile provider, for example, that the subscriber has $50 and the subscriber's phone number, and notifying the mobile provider that the subscriber's account can be replenished with minutes equivalent to $50. The mobile payments engine 14 also sends back a message to the subscriber confirming the replenishment and informing the subscriber that he or she can make phone calls.

Figure 2:
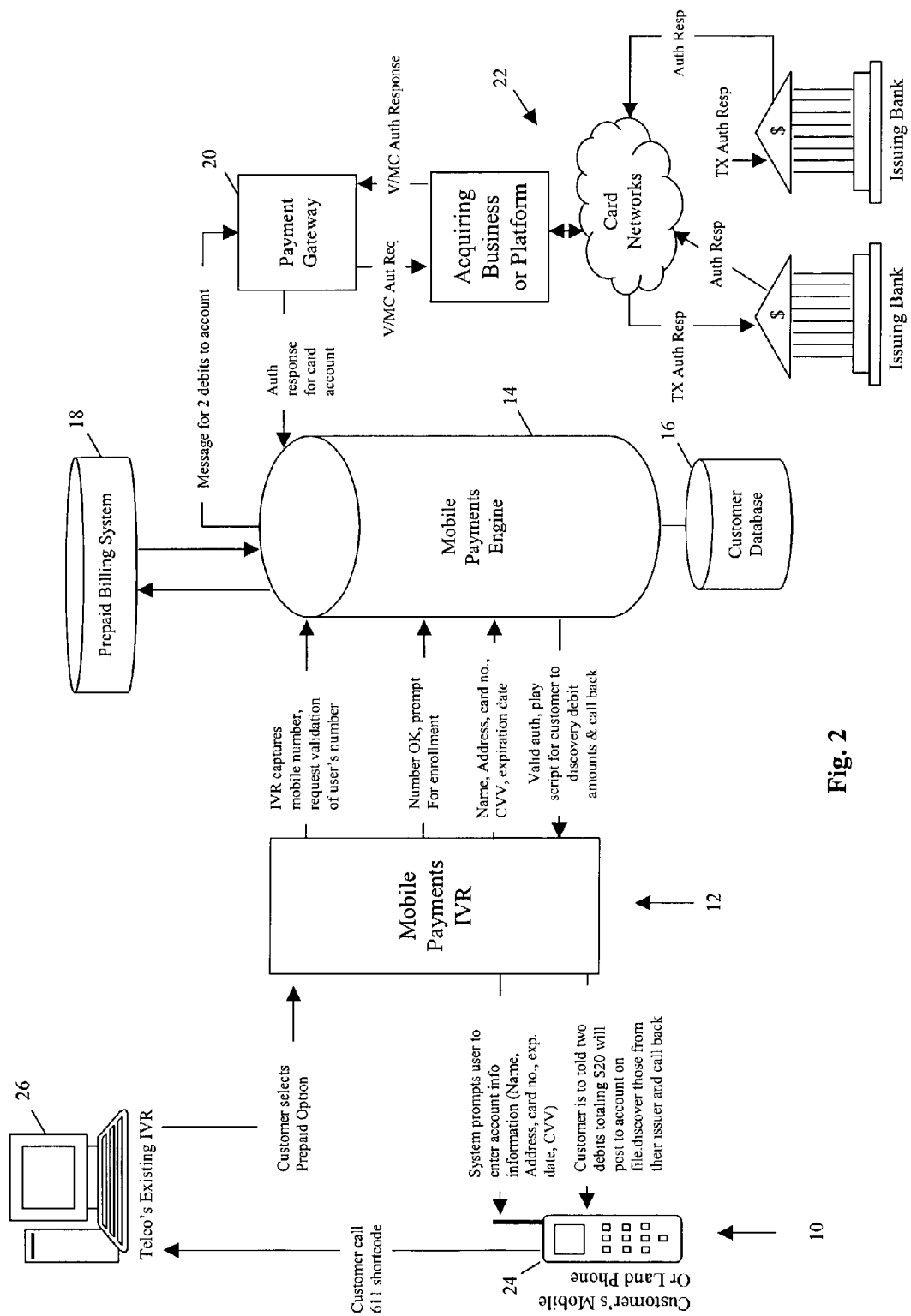
FIG. 2 is a schematic diagram that provides further detail regarding the wireless telecommunications payments system objects shown in FIG. 1 and an example of the flow of information between the system objects in the enrollment initiation process for an embodiment of the present invention.
Figure 3:
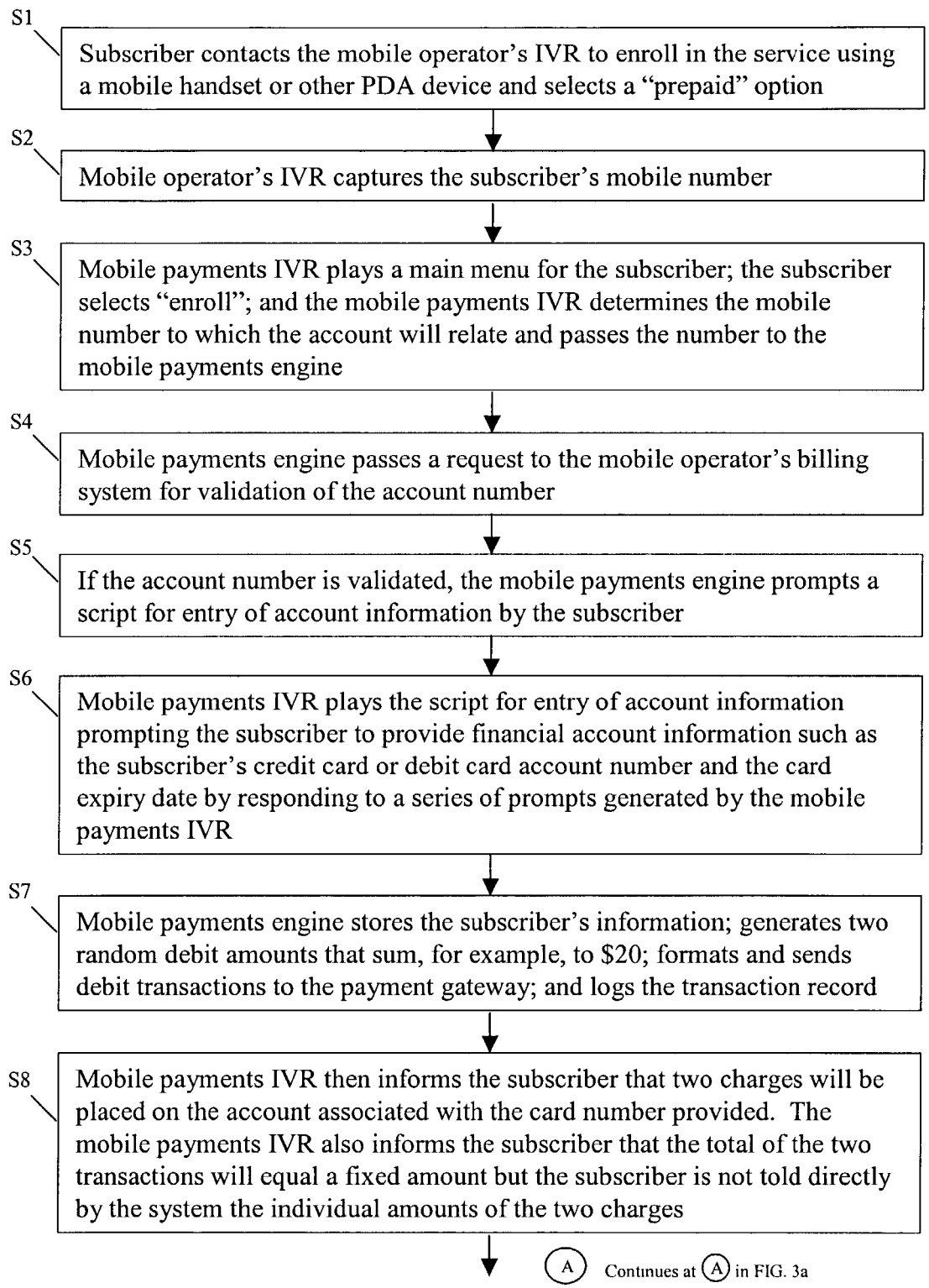
FIGS. 3 and 3a show a flow chart which illustrates an example of the enrollment initiation process in the method and system for an embodiment of the present invention.
Figure 3A:
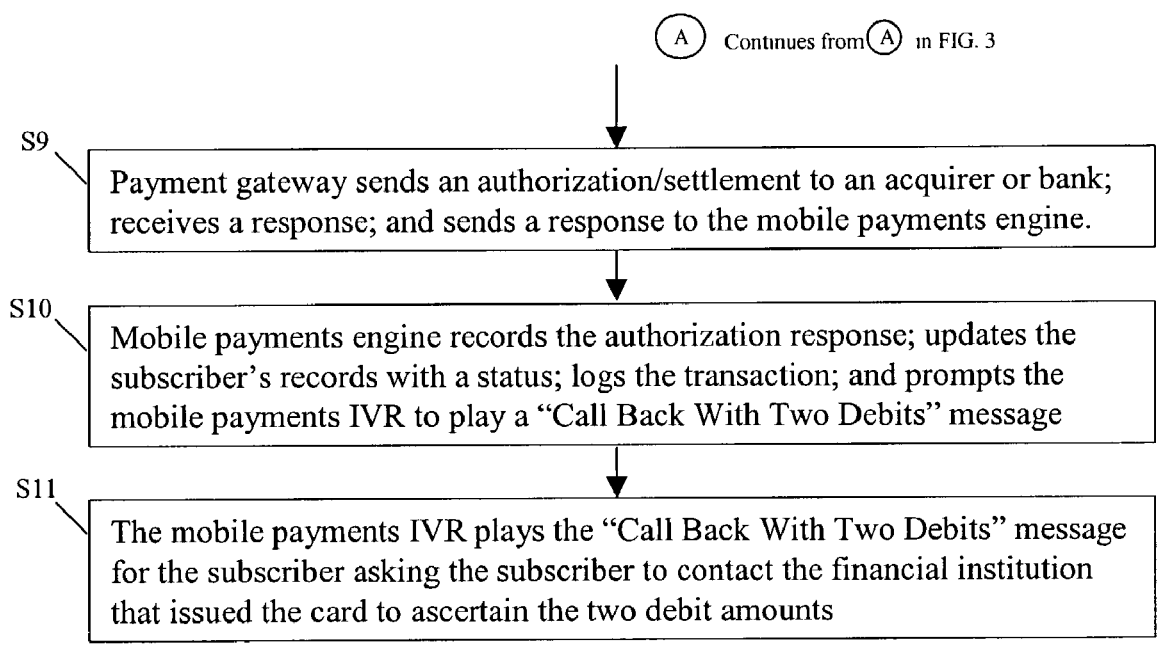

Turning now to a more detailed description of the enrollment/registration processes, FIG. 2 is a schematic diagram that provides further detail regarding the wireless telecommunications payments system objects shown in FIG. 1 and an example of the flow of information between the system objects in the enrollment initiation process for an embodiment of the present invention. FIGS. 3 and 3a show a flow chart which illustrates an example of the enrollment initiation process in the method and system for an embodiment of the present invention. Referring to FIGS. 2, 3 and 3a, in the Type 1 enrollment aspect, at S1, a subscriber contacts the mobile operator's IVR 26 to enroll in the service using a mobile handset 24 or other PDA device and selects a "Prepaid" option. At S2, the mobile operator's IVR 26 captures the subscriber's mobile number. At S3, the mobile payments IVR 12 plays a main menu for the subscriber; the subscriber selects "Enroll"; and the mobile payments IVR 12 determines the mobile number to which the account will relate and passes the number to the mobile payments engine 14.

Referring further to FIGS. 2, 3 and 3a, at S4, the mobile payments engine 14 passes a request to the mobile operator's billing system 18 for validation of the account number. If the account number is validated, at S5, the mobile payments engine 14 prompts a script for entry of account information by the subscriber. Alternatively, if the account number is not validated, the mobile payments engine 14 prompts, for example, one of a "Problems" script, an "Already Enrolled" script and a "Completion of Enrollment" script. At S6, the mobile payments IVR 12 plays the script for entry of account information prompting the subscriber to provide financial account information such as the subscriber's credit card or debit card account number and the card expiry date by responding to a series of prompts generated by the mobile payments IVR 12. The subscriber responds by typing on a keypad or speaking into a microphone.

Referring again to FIGS. 2, 3 and 3a, at S7, the mobile payments engine 14 stores the subscriber's information; generates two random debit amounts that sum, for example, to $20; formats and sends debit transactions to the payment gateway 20; and logs the transaction record. At S8, the mobile payments IVR 12 then informs the subscriber that two charges will be placed on the account associated with the card number provided. The mobile payments IVR 12 also informs the subscriber that the total of the two transactions will equal a fixed amount but the subscriber is not told directly by the system the individual amounts of the two charges. At S9, the payment gateway 20 sends an authorization/settlement to an acquirer or bank; receives a response; and sends a response to the mobile payments engine 14.

Referring once more to FIGS. 2, 3 and 3a, at S10, the mobile payments engine 14 records the authorization response; updates the subscriber's record with a status; logs the transaction; and prompts the mobile payments IVR 12 to play a "Call Back with Two Debits" message. At S11, the mobile payments IVR 12 plays the "Call Back with Two Debits" message for the subscriber asking the subscriber to contact the financial institution that issued the card to ascertain the two debit amounts. If the call is dropped, the mobile payments IVR 12 sends a message to the mobile payments engine 14 to set the subscriber record to "Failed Enrollment Initiation Attempt" and to reverse the debits.

In the Type 1 enrollment aspect, the mobile payments engine 14 generates the two random amounts that together add up to the subscriber's first replenishment amount, such as $20, at S7. These random amounts are used to create the two separate debit instructions that are processed against the subscriber's chosen payment mechanism, such as the subscriber's credit or debit card account. For illustrative purposes, assume that the two amounts are 7.50 and 12.50. At S11, the call is concluded with the mobile payments IVR 12 asking the subscriber to re-contact the system once the amounts of the charges are known by the subscriber. The subscriber can re-contact the system via any of a number of interactions described hereinafter.

Figure 4:
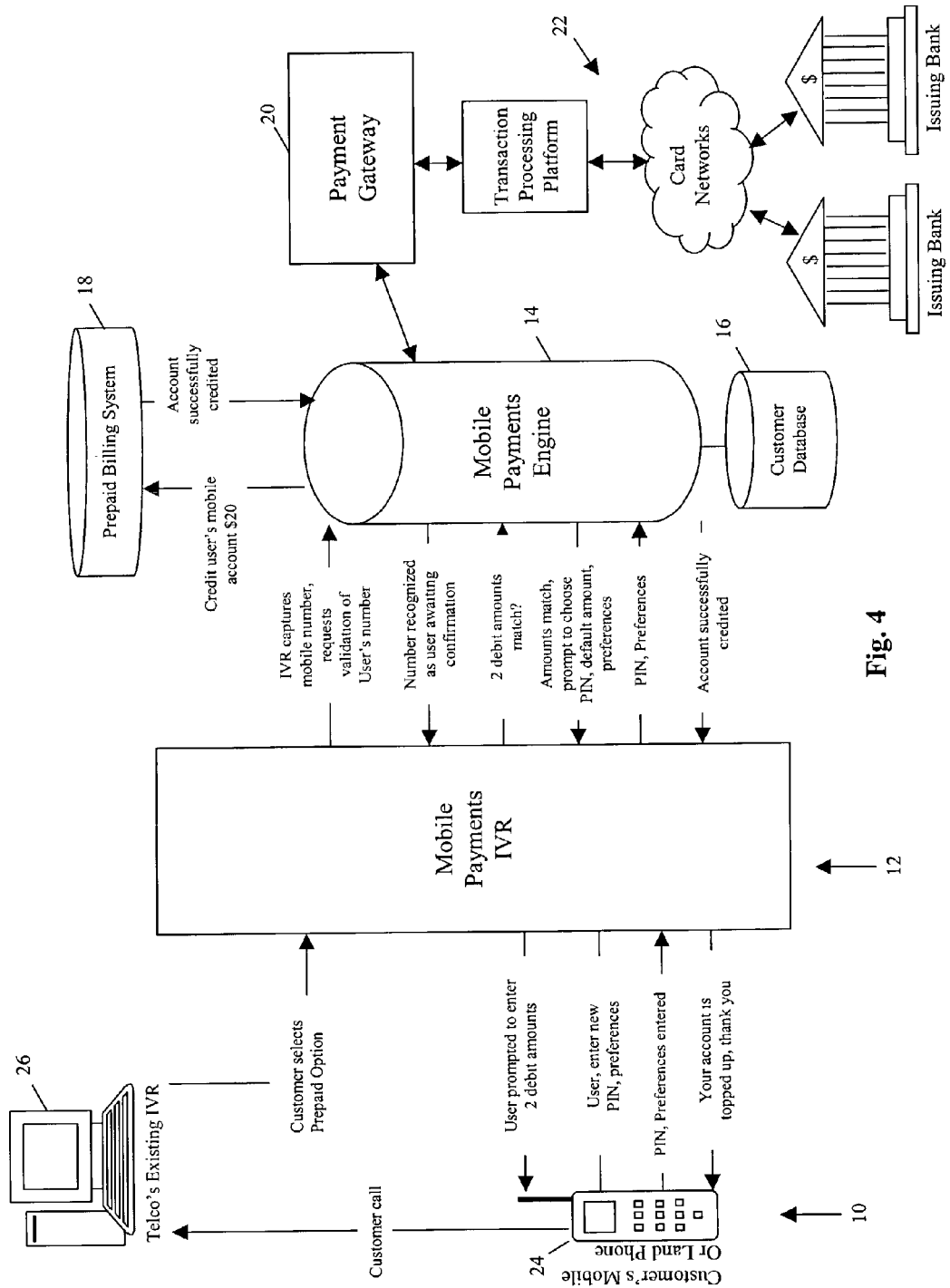
FIG. 4 is a schematic diagram that provides further detail regarding the wireless telecommunications payments system objects shown in FIG. 1 and an example of the flow of information between the system objects in the enrollment completion process for an embodiment of the present invention.
Figure 5:
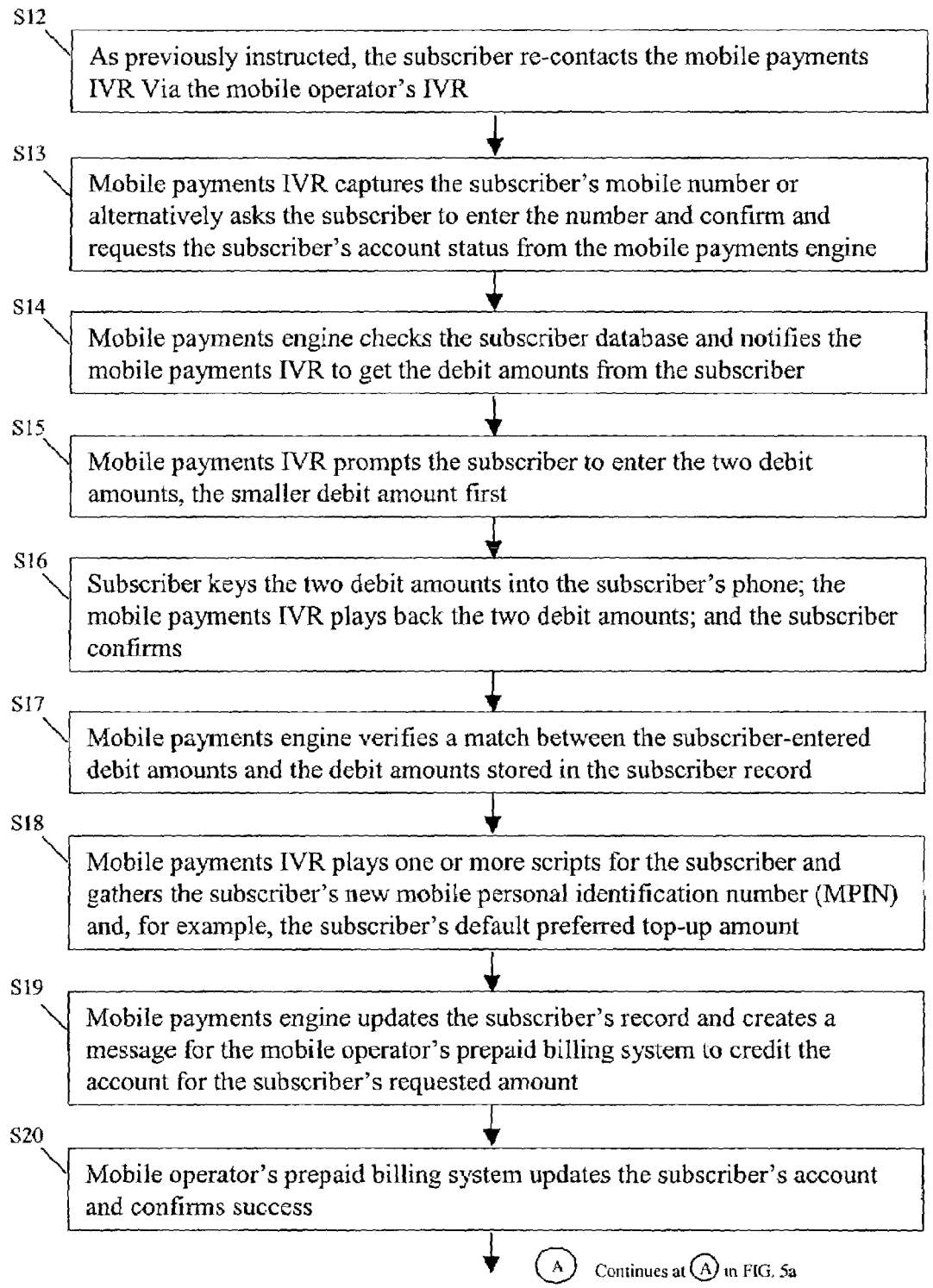
FIGS. 5 and 5a show a flow chart which illustrates an example of the enrollment completion process in the method and system for an embodiment of the present invention.
Figure 5A:
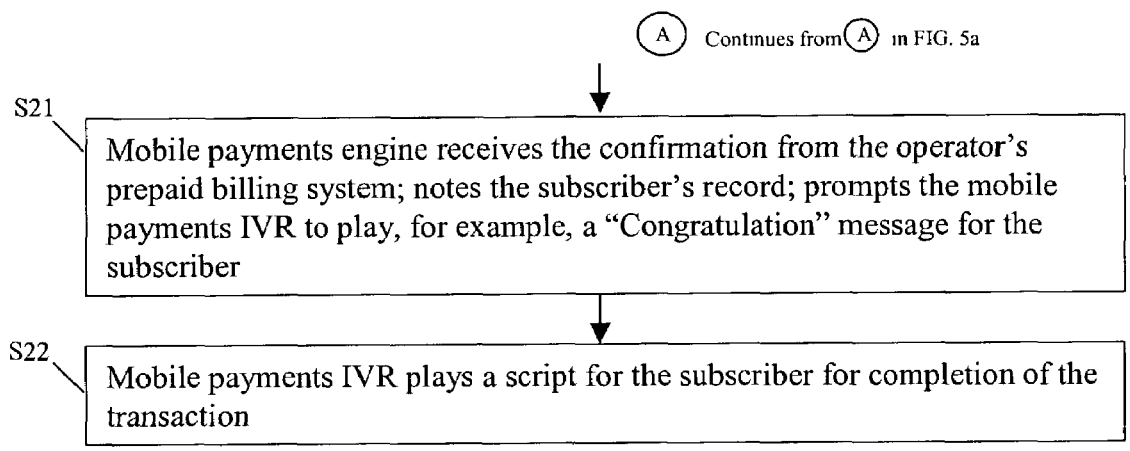

FIG. 4 is a schematic diagram that provides further detail regarding the wireless telecommunications payments system objects shown in FIG. 1 and an example of the flow of information between the system objects in the enrollment completion process for an embodiment of the present invention. FIGS. 5 and 5a show a flow chart which illustrates an example of the enrollment completion process in the method and system for an embodiment of the present invention. Referring to FIGS. 4, 5 and 5a, in the Type 1 enrollment aspect, at S12, as previously instructed, the subscriber re-contacts the mobile payments IVR 12 via the mobile operator's IVR 26. At S13, the mobile payments IVR 12 captures the subscriber's mobile number or alternatively asks the subscriber to enter the number and confirm and requests the subscriber's account status from the mobile payments engine 14. At S14, the mobile payments engine 14 checks the subscriber database 16 and notifies the mobile payments IVR 12 to get the debit amounts from the subscriber.

Referring further to FIGS. 4, 5 and 5a, at S15, the mobile payments IVR 12 prompts the subscriber to enter the two debit amounts, the smaller debit amount first. At S16, the subscriber keys the two debit amounts into the subscriber's phone; the mobile payments IVR 12 plays back the two debit amounts; and the subscriber confirms. At S17, the mobile payments engine 14 verifies a match between the subscriber-entered debit amounts and the debit amounts stored in the subscriber record. Alternatively, if a match is not verified after the subscriber is given two more opportunities, the subscriber record is marked, for example, "Failed Enrollment"; the mobile payments IVR 12 is prompted to play, for example, a "Re-enroll" script; and the two debits are reversed against the subscriber's account.

Referring again to FIGS. 4, 5 and 5a, at S18, the mobile payments IVR 12 plays one or more scripts for the subscriber and gathers the subscriber's new mobile personal identification number (mPIN) and, for example, the subscriber's default preferred replenishment amount. If the call is dropped, the mobile payments IVR 12 notifies the mobile payments engine 14 to mark the subscriber's record, for example, "Awaiting Confirmation." At S19, the mobile payments engine 14 updates the subscriber's record and creates a message for the mobile operator's prepaid billing system 18 to credit the account for the subscriber's requested amount. At S20, the mobile operator's prepaid billing system 18 updates the subscriber's account and confirms success, failure, or error.

Referring once again to FIGS. 4, 5 and 5a, at S21, the mobile payments engine receives the confirmation or error message from the operator's prepaid billing system 18; notes the subscriber's record; prompts the mobile payments IVR 12 to play, for example, a "Congratulation" or "Error" message for the subscriber. Alternatively, if the call is dropped, the subscriber's account is marked, for example, "Enrollment Confirmed, Customer Active". At S22, the mobile payments IVR 12 confirms that the call is not dropped and plays a script for the subscriber for completion of replenishment. Alternatively, if an "Error" message is returned by the mobile payments engine 14, the mobile payments IVR 12 plays a script for the subscriber, for example, to hang up, call the mobile operator's IVR 26, and follow the prompts to speak with a customer service representative.

As noted above, if the subscriber's inputs correctly match the debits previously generated by the service, the subscriber is immediately enrolled in the service, and a message is sent to the mobile operator's billing system 18 to increment the subscriber's account with the mobile operator by the amount of the two debits ($20 in the example used herein). The mobile payments engine 14 also generates a mPIN and instructs the subscriber that the subscriber's initial mPIN, for example, may be set to a number made up of a combination of the two debits. The subscriber is also given an option to self-select the mPIN. If the subscriber elects to have the system generate the mPIN, the subscriber is instructed, for example, that the lower debit amount comprises the first set of digits, and the larger debit amount comprises the latter digits of the mPIN. Hence, using the foregoing illustrative example, the subscriber's system-generated mPIN is 7501250. Alternatively, a four-digit mPIN can be generated based, for example, on one of the two debit amounts, such as 0750. The system allows the subscriber to change or personalize the subscriber's mPIN, for example, by using the subscriber's mobile handset 24 to dial or speak a series of digits conforming to the requirements of the system.

The subscriber is then asked if he or she would like to set up an automated, recurring credit to the subscriber's account with the mobile operator. If the subscriber responds positively, the subscriber is asked to choose a day of the month on which to initiate the transaction and the amount the subscriber would like to have transferred from the subscriber's financial account to the account of the mobile operator. Alternatively, the subscriber can select an option to transfer funds to the subscriber's account with the mobile operator if the subscriber's account falls below a certain threshold as determined by the subscriber. For example, the subscriber is given the option to automatically replenish the account with the mobile operator by $50 if the value in the subscriber's account falls below $10 or, for example, 10 minutes if the account is measured in units of time.

For another alternative, the subscriber can select an option to receive an alert that notifies the subscriber of a low balance situation in the account with the mobile operator. Thus, the subscriber can reply to the alert and replenish the subscriber's account with the mobile operator. Subsequent replenishment and notifications and alerts are described in greater detail hereinafter. Once the subscriber has completed the initial financial account registration process, the subscriber is asked via the mobile payments IVR 12, whether additional cards or financial accounts are to be registered in the system. If the subscriber answers affirmatively, the process described above is repeated. Once the subscriber has indicated that no more cards or financial accounts are to be registered, the subscriber is thanked and the call is ended.

The Type 2 enrollment aspect for an embodiment of the present invention is much the same as the Type 1 enrollment aspect, except that subscribers follow a series of IVR or system prompts to input information in addition to the card number and start or expiry dates, so as to satisfy network requirements that the identity of the cardholder has been sufficiently established to permit financial transactions across the network. Additional information provided by the subscriber during the Type 2 enrollment/registration process can include, for example, billing address information, Social Security number (SSN), and other security questions. In the Type 2 enrollment aspect, there is no need to perform the process of exacting two debits against the financial account, since the subscriber provides sufficient input to establish his or her identity.

Once the subscriber has completed the process of inputting the information requested by the system in the Type 2 enrollment aspect, the subscriber is given an option to self-select the subscriber's mPIN or have an mPIN generated by the system. At this point, the subscriber is enrolled in the service. The subscriber is given subsequent opportunities to change or modify the mPIN during subsequent interactions with the system. After receiving the mPIN, the subscriber is asked the dollar amount with which the subscriber would like to replenish the subscriber's account with the mobile operator. Responding to each of the system queries via the mobile payments IVR 12, the subscriber provides the dollar amount, the mPIN, and other information as directed.

In the Type 2 enrollment/registration aspect, the mobile payments engine 14 then generates the transaction in the amount requested by the subscriber and instructs the mobile operator's billing system 18 to increment the subscriber's account with the mobile operator accordingly. As in the Type 1 enrollment/registration aspect, the system then asks the subscriber via the mobile payments IVR 12 if he or she would like to set up an automated, recurring credit to the subscriber's account with the mobile operator. If the subscriber answers affirmatively, the same process as described above for establishing a recurring credit in the Type 1 enrollment/registration aspect is followed. Also, as in the Type 1 enrollment/registration aspect, the subscriber is given the opportunity to register additional cards or financial accounts. Finally the subscriber is thanked and the call is ended.

In an embodiment of the present invention, the subsequent replenishment feature is available once the subscriber has successfully completed the enrollment/registration process. The subsequent replenishment feature involves, for example, subscriber initiated replenishment or system initiated replenishment. For subscriber-initiated replenishment, when the subscriber is ready to replenish the subscriber's account with the mobile operator, the subscriber contacts the system, and the system captures the subscriber's mobile phone number via call ID if available. Alternatively, the subscriber provides the subscriber's mobile handset phone number, the subscriber's mPIN, and the desired amount to be transacted. The system validates the information and, if positive, the mobile payments engine 14 associates the incoming data to the real card or financial account number, the expiration date, and/or other information as required to initiate and complete the debit to the subscriber's registered financial account in the system. The system then performs the necessary steps to complete the transaction and to increment the subscriber's account with the mobile operator.

Figure 6:
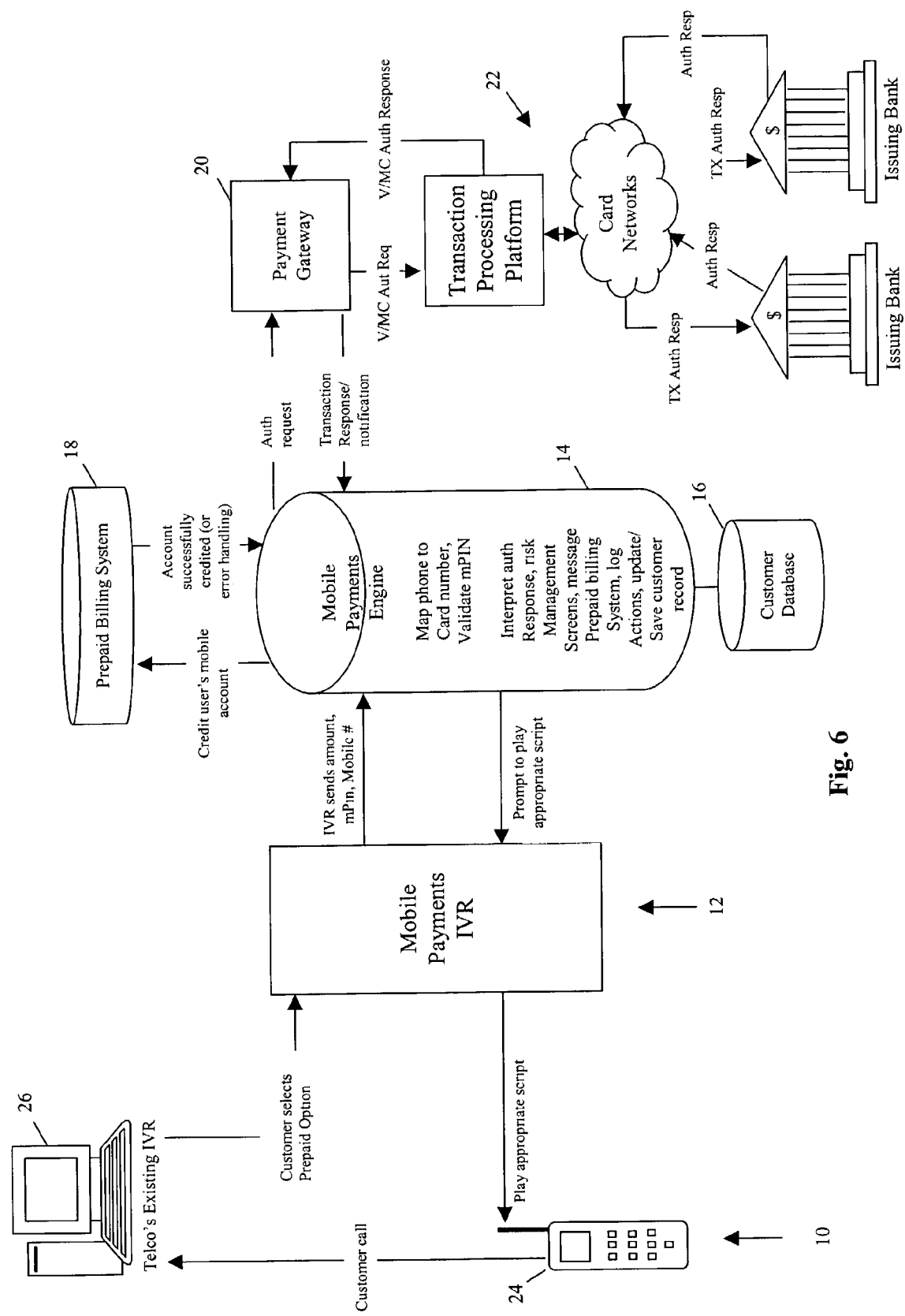
FIG. 6 is a schematic diagram that provides further detail regarding the wireless telecommunications payments system objects shown in FIG. 1 and an example of the flow of information between the system objects in the subscriber initiated replenishment transaction process for an embodiment of the present invention.
Figure 7:
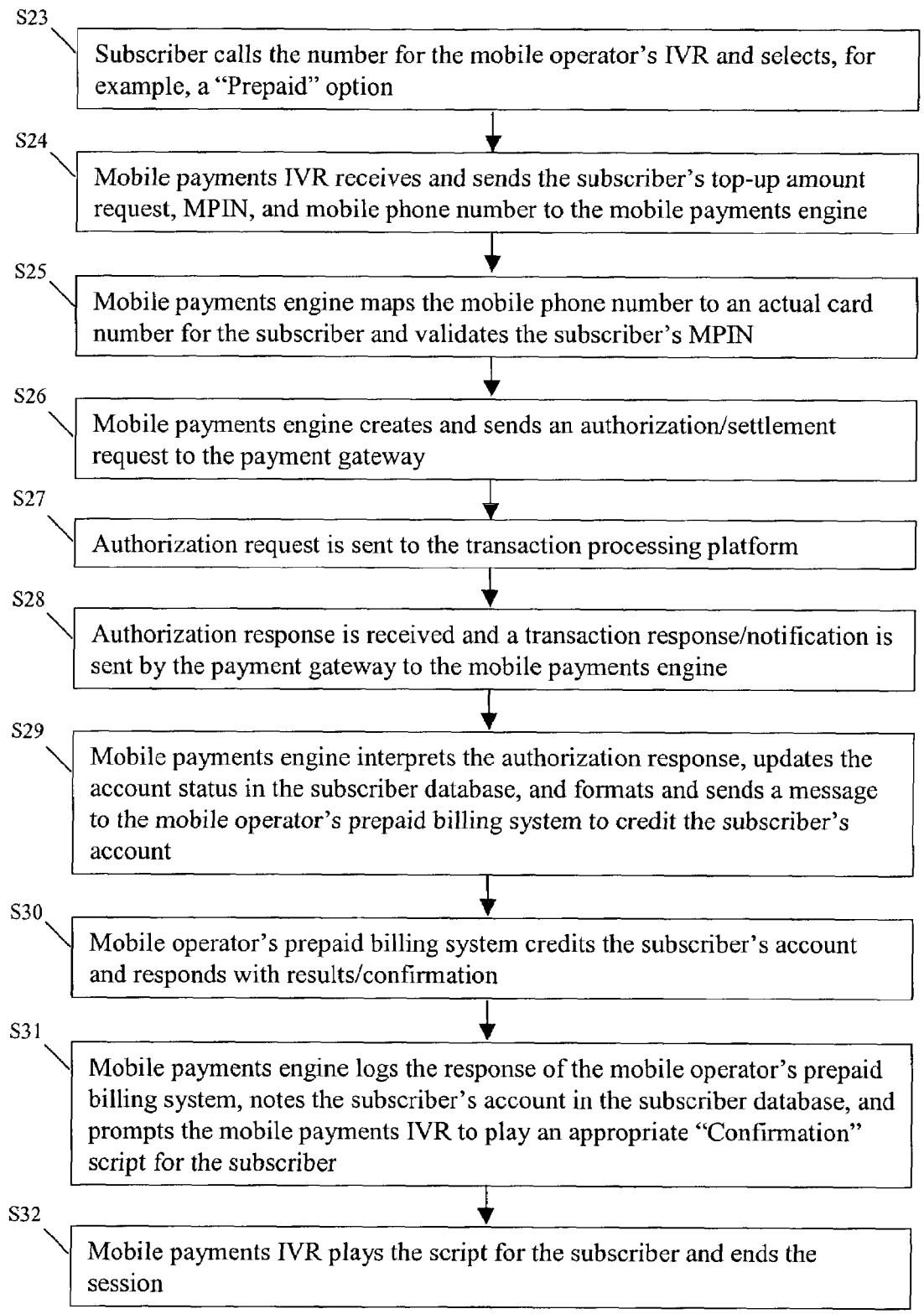
FIG. 7 is a flow chart which illustrates an example of the subscriber initiated replenishment transaction process in the method and system for an embodiment of the present invention.

FIG. 6 is a schematic diagram that provides further detail regarding the wireless telecommunications payments system objects shown in FIG. 1 and an example of the flow of information between the system objects in the subscriber initiated replenishment transaction process for an embodiment of the present invention. FIG. 7 is a flow chart which illustrates an example of the subscriber initiated replenishment transaction process in the method and system for an embodiment of the present invention. Referring to FIGS. 6 and 7, at S23, the subscriber calls the number for the mobile operator's IVR 26 and selects, for example, a "Prepaid" option. At S24, the mobile payments IVR 12 receives and sends the subscriber's replenishment amount request, mPIN, and mobile phone number to the mobile payments engine 14. At S25, the mobile payments engine 14 maps the mobile phone number to an actual card number for the subscriber and validates the subscriber's mPiN. At S26, the mobile payments engine 14 creates and sends an authorization/settlement request to the payment gateway 20.

Referring further to FIGS. 6 and 7, at S27, the authorization request is sent to the transaction processing platform 22, and at S28, an authorization response is received and a transaction response/notification is sent by the payment gateway 20 to the mobile payments engine 14. At S29, the mobile payments engine 14 interprets the authorization response, updates the account status in the subscriber database 16, and formats and sends a message to the mobile operator's prepaid billing system 18 to credit the subscriber's account. At S30, the mobile operator's prepaid billing system 18 credits the subscriber's account and responds with results/confirmation. At S31, the mobile payments engine 14 logs the response of the mobile operator's prepaid billing system 18, notes the subscriber's account in the subscriber database 16, and prompts the mobile payments IVR 12 to play an appropriate "Confirmation" script for the subscriber. At S32, the mobile payments IVR 12 plays the script for the subscriber and ends the session.

For system initiated replenishment, if the subscriber has established the automated replenishment option, the system generates the transaction from the subscriber's registered financial account and notifies the mobile operator's billing system 18 to increment the subscriber's account with the mobile operator. This process can occur automatically, for example, if the subscriber has opted to allow the system to automatically replenish the account with the mobile operator once the balance of the subscriber's account has fallen below a desired minimum. Alternatively, the system can generate a call or send a text message to the subscriber's mobile handset 24 or device and prompt the subscriber to provide the subscriber's mPIN and desired transaction amount to debit the registered financial account in the system. As previously described, the mobile payments engine 14 associates the incoming data to the real card or financial account number for the subscriber, the expiration date, and/or other information as required to initiate and complete the debit to the subscriber's registered financial account in the system. The system then performs the necessary steps to complete the transaction and to increment the subscriber's account with the mobile operator.

The method and system for an embodiment of the present invention makes use of various types of subscriber interaction methods 10 with the system. FIG. 8 is a table that shows examples of subscriber interaction methods/distributions channels 10 for an embodiment of the present invention. Referring to FIG. 8, such subscriber interaction methods/distributions channels 10 include, for example, a mobile telephone handset or PDA device 30, the Internet 32, a PC 34, a landline telephone 36, an ATM and ATM network 38, a kiosk 40, and/or a POS device or terminal 42. Thus, the subscriber has multiple options by which to connect and interact with the system for an embodiment of the present invention. It is to be understood that the enumeration of particular subscriber interaction methods 10 is not to be taken as limiting, and the present invention includes any and all other subscriber interaction methods that may develop over time as new channels emerge due to changes in technology and as new mobile and new banking products come to market.

In a DTMF recognition aspect of the mobile telephone handset or PDA device 30, the subscriber interacts with the system, for example, by contacting the IVR 12, listening to the audible information inquiry prompts, and dialing alphanumeric character responses on the device keypad. The IVR/system 12 is configured to recognize the alphanumeric entries and associates such entries with data elements required for other processes within the system. The system associates the incoming data to the real card or financial account number, the expiration date, and/or other information as required for the mobile payments engine 14 to initiate the funds transfer from the subscriber's registered financial account in the system. The system then performs the necessary steps to complete the funds transfer transaction and to increment the subscriber's account with the mobile operator.

In a speech recognition aspect of the mobile telephone handset or PDA device 30, additionally, the IVR 12 can be equipped, for example, with speech recognition features. In such instances the subscriber is given the option to speak responses for the queried information into the handset microphone in lieu of the DTMF process described above. The IVR 12 is configured to recognize spoken answers in the local language, or dialect, and to convert the spoken responses into data elements required for other processes within the system. The system associates the spoken responses to the real card or financial account number, the expiration date, and/or other information as required for the mobile payments engine 14 to initiate the funds transfer from the subscriber's registered financial account in the system. The system then performs the necessary steps to complete the funds transfer transaction and to increment the subscriber's account with the mobile operator.

An alternate method of interacting the system for an embodiment of the present invention involves, for example, the use of a text message aspect of the mobile telephone handset or PDA device 30. With the text message type of interaction, the subscriber does not use the telephone feature to contact the IVR 12. Instead, interaction occurs via text messages between the subscriber and the system and which are carried over the mobile operator's cellular or wireless network. The subscriber views the messages on the handset screen and uses the keypad to type alphanumeric responses that are recognized by the system and associated with data elements required for other processes within the system.

Upon notification of transaction success from the financial network 22, the system notifies the mobile operator's billing system 18 to increment the subscriber's account with the mobile operator. Simultaneously, the system notifies the subscriber the status of the transaction. In cases where the mobile device 30 is equipped, for example, with a "Speak 'n Text" feature, the subscriber may respond to text messages appearing on the screen by speaking into the device microphone. As described above, the system recognizes the spoken responses to the text messages and associates those inputs to the registered financial account in the system. The system then performs the necessary steps to complete the transaction and to increment the subscriber's account with the mobile operator.

Yet another subscriber interaction mode for an embodiment of the present invention involves use by the subscriber of a device, for example, that has the ability to access the Internet 32 via wireless modem. In this type of interaction, the subscriber follows the enrollment/registration and replenishment processes by keying in data directly on the pad of the handset. The data is captured at a website or sites specifically formatted for the handset or PDA device 30. The system captures the inputs and associates the data to the registered financial account. Transactions are subsequently generated and processed via the methods described above. A key benefit for this type of interaction is that it allows subscribers to access the websites of the financial institution which issued the card that the subscriber is registering. Thus, the subscriber can easily access the websites of the financial institution to ascertain the two debits. Consequently, the subscriber does not necessarily have to disengage from the enrollment process and can conceivably complete the process in a single session.

Still another type of subscriber interaction with the system for an embodiment of the present invention, for example, is from the subscriber's PC 34. Once again, the subscriber follows the enrollment/registration and replenishment processes by keying in data at a PC 34 or other computer terminal. The data is captured in websites formatted for PC use and the subscriber is allowed to access his account with the mobile operator from any terminal with a connection to the Internet 32. The system captures the data and associates the input to data elements required for other processes within the system. In order to use the PC 34 or Web interface for the enrollment/registration process, the Type 1 method can preferably be employed. Under conditions under which the subscriber is able to enter a financial account personal identification number (PIN), such as an ATM PIN as opposed to the mPIN, online with an appropriate degree of security, the Type 2 enrollment registration process can be used, because the subscriber is sufficiently identified to perform the transaction.

A further type of subscriber interaction with the system for an embodiment of the present invention is via landline telephones 36. The subscriber can use a landline telephone 36 to perform the enrollment/registration and replenishment process by contacting the IVR 12. The subscriber provides the mobile handset number and other required data elements by using either the keypad or speaking into the telephone mouthpiece if the IVR 12 is equipped with speech recognition features to respond to the audible informational prompts generated by the IVR 12. For landline telephone enrollment/registration, the subscriber preferably follows the Type 1 method.

Subscriber interaction with the system for an embodiment of the present invention can also occur via ATMs and the ATM networks 38. Typically, an ATM card transaction is against a demand deposit account, such as a checking account or savings account. However, an ATM card transaction can also be against any account that the ATM card accesses, including credit card accounts. The ATM process is similar to the PC interaction. Subscribers key in registration/enrollment and replenishment data at an ATM machine that displays screens specifically formatted for the ATM device and networks 38. Subscribers who choose to enroll in the service, for example, at an ATM machine preferably undergo the Type 2 enrollment/registration process. The subscriber inserts or swipes the credit or debit card in the ATM machine. The ATM machine follows the subscriber identification process by asking the subscriber to enter on the ATM keypad the financial account PIN number associated with the credit or debit card as opposed to the subscriber's mPIN. At this point, the Subscriber is given an option to select the mobile payments service for an embodiment of the present invention from one of the ATM menus.

Because the financial account PIN which the subscriber entered is validated by the financial institution at the time of the transaction, there is no need to generate the two debits as described in the Type 1 process above. Rather, in the ATM aspect 38, the subscriber provides the information, such as the subscriber's mobile handset number or the number for the subscriber's account with the mobile operator number to complete the enrollment/registration process. As described above, the system provides an option for the subscriber to self-select an mPIN or the system generates an mPIN. The subscriber also has the opportunity to change the mPIN using the ATM keypad. Thereafter, the subscriber follows the prompts to enter transaction amounts and other data related to the transaction. In conjunction with the system, the ATM is configured to process the transactions along the appropriate network, and the mobile payments engine 14 instructs the mobile operator's billing system 18 to increment the subscriber's account with the mobile operator accordingly.

Another subscriber interaction method for an embodiment of the present invention involves the use, for example, of kiosks 40. In the kiosk aspect 40, subscribers can present their credit or debit cards, for example, to specially-equipped kiosks 40 that have the ability to read the card information from a POS terminal or other terminals available at the kiosk 40. If manned, for example, the kiosk operator can perform various ID checks to ensure the legitimacy of the cardholder and a Type 2 enrollment/registration method can be used. If unmanned, for example, the kiosk 40 can operate by providing PC or Web access to enable the subscriber to adequately perform the enrollment/ registration and replenishment processes. In that case, for example, the Type 1 process can be use.

Subscriber interaction with the system for an embodiment of the present invention can also occur using retail point of sale (POS) devices or terminals 42, which can be made available to participating retailers. Working in the same fashion as a kiosk 40, retail attendants can be trained to perform the necessary ID checks and other security processes to enable subscribers to enroll in the system and replenish the account with the mobile operator. The POS devices or terminals 42 are configured to capture financial account information and to perform the various ID checks. The POS devices or terminals 42 are also configured to access a wallet or stored-value account and to transfer those funds to the mobile operator or other entity. Performing the enrollment/registration process at the POS terminal 42 can be achieved using, for example, the Type 2 Method wherein the subscriber enters in the financial account information and PIN as necessary.

Another feature of the method and system for an embodiment of the present invention includes, for example, multiple financial and subscriber account registrations. The ATM card transaction is typically against a demand deposit account (DDA), such as a checking account or savings account. However, the ATM card transaction can be against any account that the ATM card accesses, such as a Christmas fund or the like. Further, it can also be a credit card. For example, the subscriber is asked if he or she would like to enroll more than one card, and if the subscriber chooses, he or she can enroll the subscriber's credit card. An aspect of the present invention allows the subscriber to enroll whatever source of funds the subscriber wishes to use, so long as the financial institution can have access to the source of funds through a network or other link. Another aspect of the present invention provides a system that is ubiquitous within the particular network, so that the financial institution is able to debit an account enrolled by the subscriber regardless of the bank with which the account resides.

The system for an embodiment of the present invention provides the ability, for example, for subscribers to register and associate multiple credit or debit cards or other financial accounts or instruments with a single subscriber account with the mobile operator. The subscriber is given the option to set a default card or financial account within the system for the replenishment process and is queried at the time of replenishment whether the default or other card or financial account should be used. Alternatively, a single card or financial account can be associated with multiple accounts with the mobile operator. One example of this scenario is envisioned, for example, for families that maintain multiple accounts with the mobile operator but who may wish to replenish using a single financial account or other financial instrument. Other examples include businesses in which a business financial account can support multiple subscriber accounts with the mobile operator. In such cases, the cardholder or accountholder is notified via one of the interaction methods described above to effect the funds transfer to the mobile operator in exchange for the incrementing of the parent or child account with the mobile operator.

A further feature of the method and system for an embodiment of the present invention is notifications and alerts. Once the Subscriber is enrolled with the service, the system can be used to generate notifications and alerts to subscribers to cover a variety of situations from low account balances with the mobile operator to replenishment due dates, which can typically be 60 or 90 days from the last replenishment. Notifications and alerts can take a variety of forms, for example, from outbound calls to the subscriber from the IVR 12 to outbound text messages to the subscriber's mobile handset or PDA device 30. Notifications and alerts can also be made available via the ATM 38, the PC 34, or other interfaces involving the Internet and communications networks 32. Upon receiving the notification or alert, the subscriber enters the mPIN, and the transaction amount. The system completes the process of transferring the funds to the mobile operator and increments the subscriber's account with the mobile operator as described above.

An additional feature of the method and system for an embodiment of the present invention is bill presentment and payment. Once the subscriber is enrolled in the service, the system can be used, for example, to provide third party billers with the ability to present bills or invoices to subscribers for payment. Subscribers can use the system, for example, to transfer funds from the registered financial account to the financial account of the biller. As in the notifications and alerts process described above, there are several options for the biller to notify or alert the subscriber that a bill is available for payment. These notifications range, for example, from an outbound call from the IVR 12 to an outbound text message. Additionally, a notification can appear on the Website when a subscriber logs onto the Internet 32, or a message can be displayed at the ATM screen when a subscriber transacts at an ATM 38. The subscriber is given the option, for example, to pay the presented bill by using the system to transfer the funds from the subscriber's registered financial account to the biller's financial account as previously described.

Another feature of the method and system for an embodiment of the present invention is stored value. In one aspect of the stored value feature, the subscriber uses the system to transfer funds from the registered financial account to an account which is specifically setup as a stored value account. The stored value account can reside, for example, with a mobile operator, a financial institution, on hardware such as on a computer chip, or with another entity. The funds being transferred to the stored value account are not exchanged for airtime, but can be stored and used later, for example, for the purchase of other goods and services. Alternatively, a stored value account can be the registered account in the system from which the subscriber transfer funds to the mobile operator in exchange for airtime or some other form of value, or to other entities for the purchase of other goods and services.

An illustrative example of this scenario involves college campuses. Many colleges operate financial accounts on behalf of their students, who may not have, or who may not be eligible to establish, credit card or banking relationships. Those accounts are registered via the processes described above in lieu of registering an account with a financial institution. Hence, the service can be marketed to subscribers who may not have a credit or debit card with which to register in the system but have another account type or financial vehicle which the service can access.

Still another feature of the method and system for an embodiment of the present invention is wallet functionality. As previously described, the system for an embodiment of the present invention can serve as a wallet with one or more payment vehicles, such as credit cards, debit cards, stored value accounts, and the like, registered on behalf of the subscriber and providing the subscriber with options as to which payment vehicle to use for which intended purpose, such as airtime replenishment, merchandise or service purchase, bill payment, or the like. The system, for example, permits subscribers to register a default payment vehicle for each feature enabled on the system. Thus, while a registered credit card may be the default for the replenishment feature, the registered debit card could be the default vehicle for the bill payment feature.

In essence, in the wallet functionality feature, the mobile handset or other PDA device 30 serves as a wallet of payment vehicles just as if the subscriber were carrying the cards or other financial account information on his or her person. For example, in the POS scenario 42, in which a retailer is enabled on the service, the subscriber chooses to make a purchase using the mobile handset or other device 30 to implement the funds transfer. At the time of payment, the enrolled subscriber has the option to use the mobile handset or other PDA device 30 to instruct the system to transfer funds from the subscriber's registered financial account to the retailer's account. This is achieved, for example, by the subscriber providing the mPIN, the transaction amount, and the required retailer account information by either entering the data onto the keypad or speaking into the device microphone for a speech recognition-enabled system as the system prompts the subscriber for replies.

Various preferred embodiments of the invention have been described in fulfillment of the various objects of the invention. It should be recognized that these embodiments are merely illustrative of the principles of the invention. Numerous modifications and adaptations thereof will be readily apparent to those skilled in the art without departing from the spirit and scope of the present invention.

The invention claimed is:

1. A method for prepaying wireless telecommunications charges, comprising:

receiving information identifying a user's wireless telecommunication device by a mobile payments engine via a mobile payments interactive voice response unit;

passing the information identifying the wireless telecommunication device to a mobile operator's billing system with a request for validation of a mobile account for the user related to the device;

if validation of the account is received from the mobile operator's billing system, receiving financial source account information from the user by the mobile payments engine via the mobile payments interactive voice response unit;

receiving user identity verification information from the user by the mobile payments engine, wherein receiving the user identity verification information further comprises receiving by the mobile payments engine via the mobile payments interactive voice response unit the user's entry of a secret shared between the user and the mobile payments engine, wherein receiving the user's entry of the shared secret further comprises receiving the user's entry of at lease two debit amounts previously charged to the financial source account for the user via the mobile payments engine, and wherein receiving the user's entry of the at least two debit amounts further comprises generating the at lease two debit amounts by the mobile payments engine that sum to a predetermined total debit amount requested by the user;

assigning a mobile personal identification number for the user by the mobile payments engine; and arranging a credit from the financial source account to the user's mobile account by the mobile payments engine via the mobile operator's prepaid billing system.

2. The method of claim 1, wherein receiving the information identifying the wireless telecommunications device further comprises receiving a mobile phone number of the user.

3. The method of claim 2, wherein receiving the user's mobile phone number further comprises receiving the user's mobile phone number via the mobile payments interactive voice response unit from a mobile operator's interactive voice response unit.

4. The method of claim 1, wherein receiving the financial source account information further comprises prompting the mobile payments interactive voice response unit by the mobile payments engine to play a script for the user for entry of the financial source account information.

5. The method of claim 4, wherein receiving the financial source account information further comprises receiving financial source account identification information for at least one of a user's credit card account, a user's debit card account, and a user's deposit account.

6. The method of claim 5, wherein receiving the financial source account information further comprises storing the financial source account information in a subscriber's database by the mobile payments engine.

7. The method of claim 1, wherein generating the at least the two debit amounts further comprises formatting and sending debit transactions for the at least two debit amounts to a payment gateway by the mobile payments engine.

8. The method of claim 7, wherein generating the at least two debit amounts further comprises notifying the user by the mobile payments engine via the mobile payments interactive voice response unit that at least two sums equal to the predetermined total debit amount will be charged to the financial source account without disclosing the at least two debit amounts to the user.

9. The method of claim 8, wherein receiving the user's entry of the at least two debit amounts further comprises prompting the user by the mobile payments engine via the mobile payments interactive voice response unit to contact a financial institution with which the financial source account is held to ascertain the at least two debit amounts.

10. The method of claim 1, wherein receiving the user identity verification information further comprises receiving an identification characteristic assigned by a trusted third party for the user by the mobile payments engine via the mobile payments interactive voice response unit.

11. The method of claim 10, wherein receiving the identification characteristic assigned by the trusted third party further comprises receiving a Social Security System number for the user.

12. The method of claim 1, wherein assigning the mobile personal identification number further comprises generating the mobile personal identification number for the user by the mobile payments engine.

13. The method of claim 1, wherein assigning the mobile personal identification number further comprises allowing the user to self-select the mobile personal identification number.

14. The method of claim 1, wherein arranging the credit further comprises receiving the information identifying the user's wireless telecommunication device, the user's mobile personal identification number, and a credit amount for the user by the mobile payments engine via the mobile payments interactive voice response unit.

15. The method of claim 14, wherein arranging the credit further comprises mapping the information identifying the user's wireless telecommunication device to the user's financial source account and validating the user's mobile payments personal identification number by the mobile payments engine.

16. The method of claim 15, wherein arranging the credit further comprises sending an authorization request for the credit amount to a payment gateway by the mobile payments engine and receiving an authorization response for the credit amount by the mobile payments engine from the payment gateway.

17. The method of claim 16, wherein arranging the credit further comprises sending a message by the mobile payments engine to the mobile operator's prepaid billing system to credit the user's account with the credit amount, receiving a response by the mobile payments engine from the mobile operator's prepaid billing system confirming the credit, and confirming the credit to the user by the mobile payments engine via the mobile payments interactive voice response unit.

18. The method of claim 1, further comprising establishing an automated, recurring credit to the user's mobile account by the mobile payments engine.

19. A method for prepaying wireless telecommunications charges, comprising:
  capturing a phone number of a wireless phone of a user by a mobile payments engine via a call by the user to an interactive voice response unit;
  receiving the user's entry by the mobile payments engine via the interactive voice response unit of financial source account identification information that allows access by the mobile payments engine to at least one source account of funds of the user through a link;
  notifying the user by the mobile payments engine via the interactive voice response unit that at least two debits in an amount between 0 and a predetermined number of units of applicable currency from the financial source account will be posted to a user account with a preselected wireless phone provider;
  directing the user via the interactive voice response unit to contact a financial institution with which the financial source account is held to verify the amounts of the at least two debits and to contact the interactive voice response unit via a second toll-free call with the user's wireless phone number;
  upon receiving the user's second toll-free call by the interactive voice response unit, confirming the user's wireless phone number via caller ID and prompting the user to enter the at least two debit amounts;
  if the user enters the at least two debit amounts correctly, crediting the at least two debits to the user account with the wireless phone provider and providing the user a mobile personal identification number for use by the user in future transactions via the mobile payments engine;
  thereafter, receiving information from the user by the mobile payments engine via the mobile payments interactive voice response unit consisting at least in part of the user's mobile personal identification number, the user's wireless phone number and a requested replenishment amount;
  mapping the information received from the user by the mobile payments engine to the financial source account information for the user;
  passing the information received from the user by the mobile payments engine via the link to the financial institution with which the financial source account is held;
  receiving an authorization message by the mobile payments engine via the link from the financial institution with which the financial source account is held;
  passing the authorization message by the mobile payments engine to a prepaid billing system of the wireless phone provider informing the wireless phone provider to credit the user account with the wireless phone provider with the requested replenishment amount; and
  sending a message to the user via the mobile payments interactive voice response unit by the mobile payments engine confirming the credit.

20. A system for prepaying wireless telecommunications charges, comprising:
  a mobile payments engine adapted for receiving information identifying a user's wireless telecommunication device via a mobile payments interactive voice response unit, passing the information identifying the wireless telecommunication device to a mobile operator's billing system with a request for validation of a mobile account for the user related to the device, and if validation of the account is received from the mobile operator's billing system, receiving financial source account information from the user via the mobile payments interactive voice response unit;
  the mobile payments engine being further adapted for receiving user identity verification information by the mobile payments engine via the mobile payments interactive voice response unit, assigning a mobile personal identification number for the user, and arranging a credit from the user's financial source account to the user's mobile account via the mobile operator's prepaid billing system; and
  wherein the mobile payments engine is further adapted for receiving via the mobile payments interactive voice response unit the user's entry of a secret shared between the user and the mobile payments engine, and wherein the mobile payments engine is further adapted for receiving the user's entry of at least two debit amounts previously charged to the financial source account for the user via the mobile payments engine.

21. The system of claim 20, wherein the mobile payments engine is further adapted for receiving the information identifying the wireless telecommunications device comprising a mobile phone number of the user.

22. The system of claim 21, wherein the mobile payments engine is further adapted for receiving the user's mobile phone number via the mobile payments interactive voice response unit from a mobile operator's interactive voice response unit.

23. The system of claim 20, wherein the mobile payments engine is further adapted for prompting the mobile payments interactive voice response unit to play a script for the user for entry of the financial source account information.

24. The system of claim 23, wherein the mobile payments engine is further adapted for receiving financial source account identification information for at least one of a user's credit card account, a user's debit card account, and a user's deposit account.

25. The method of claim 24, wherein the mobile payments engine is further adapted for storing the financial source account information in a subscriber's database.

26. The system of claim 20, wherein the mobile payments engine is further adapted for generating the at least two debit amounts that sum to a predetermined total debit amount requested by the user.

27. The method of claim 26, wherein the mobile payments engine is further adapted for formatting and sending debit transactions for the at least two debit amounts to a payment gateway.

28. The system of claim 27, wherein the mobile payments engine is further adapted for notifying the user via the mobile payments interactive voice response unit that at least two sums equal to the predetermined total debit amount will be charged to the financial source account without disclosing the at least two debit amounts to the user.

29. The method of claim 28, wherein the mobile payments engine is further adapted for prompting the user via the mobile payments interactive voice response unit to contact a financial institution with which the financial source account is held to ascertain the at least two debit amounts.

30. The system of claim 20, wherein the mobile payments engine is further adapted for receiving a Social Security System number for the user by the mobile payments engine via the mobile payments interactive voice response unit.

31. The method of claim 20, wherein the mobile payments engine is further adapted for generating the mobile personal identification number for the user.

32. The system of claim 20, wherein the mobile payments engine is further adapted for allowing the user to self-select the mobile personal identification number.

33. The system of claim 20, wherein the mobile payments engine is further adapted for receiving the information identifying the user's wireless telecommunication device, the user's mobile personal identification number, and a credit amount for the user via the mobile payments interactive voice response unit.

34. The system of claim 33, wherein the mobile payments engine is further adapted for mapping the information identifying the user's wireless telecommunication device to the user's financial source account and validating the user's mobile payments personal identification number.

35. The method of claim 34, wherein the mobile payments engine is further adapted for sending an authorization request for the credit amount to a payment gateway and receiving an authorization response for the credit amount from the payment gateway.

36. The system of claim 35, wherein the mobile payments engine is further adapted for sending a message to the mobile operator's prepaid billing system to credit the user's account with the credit amount, receiving a response from the mobile operator's prepaid billing system confirming the credit, and confirming the credit to the user via the mobile payments interaction voice response unit.

37. The system of claim 20, wherein the mobile payments engine is further adapted for establishing an automated, recurring credit to the user's mobile account.

38. A system for prepaying wireless telecommunications charges, comprising:

a mobile payments engine adapted for capturing a phone number of a wireless phone of a user by via a call by the user to an interactive voice response unit, receiving the user's entry via the interactive voice response unit of financial source account identification information that allows access by the mobile payments engine to at least one source account of funds of the user through a link;

the mobile payments engine being further adapted for notifying the user via the interactive voice response unit that at least two debits in an amount between 0 and a predetermined number of units of applicable currency from the financial source account will be posted to a user account with a preselected wireless phone provider and directing the user via the interactive voice response unit to contact a financial institution with which the financial source account is held to verify the amounts of the at least two debits and to contact the interactive voice response unit via a second toll-free call with the user's wireless phone number;

the mobile payments engine being adapted, upon receiving the user's second call via the interactive voice response unit, for confirming the user's wireless phone number via caller ID and prompting the user to enter the at least two debit amounts, and if the user enters the at least two debit amounts correctly, crediting the two debits to the user account with the wireless phone provider and providing the user a mobile personal identification number for use by the user in future transactions via the mobile payments engine;

the mobile payments engine being further adapted for thereafter receiving information from the user via the mobile payments interactive voice response unit consisting at least in part of the user's mobile personal identification number, the user's wireless phone number and a requested replenishment amount, mapping the information received from the user to the financial source account information for the user, passing the information received from the user via the link to the financial institution with which the financial source account is held, receiving an authorization message via the link from the financial institution with which the financial source account is held, passing the authorization message to a prepaid billing system of the wireless phone provider informing the wireless phone provider to credit the user account with the wireless phone provider with the requested replenishment amount, and sending a message to the user via the mobile payments interactive voice response unit confirming the credit.

* * * * *